Patented Aug. 8, 1944

2,355,098

UNITED STATES PATENT OFFICE 2,355,098

PROCESSING CORN

Sidney Musher, New York, N. Y., assignor to Musher Foundation Incorporated, New York, N. Y., a corporation of New York No Drawing. Application February 18, 1941, Serial No. 379,441

12 Claims. (Cl. 252—398)

The present invention relates to the processing of corn and particularly relates to improvements in the steeping of whole corn prior to extraction and separation of the starch, gluten, and other materials therefrom.

In the usual processing of corn, the whole corn is steeped in water not exceeding about 110° F. to 115° F. for about 30 to 40 hours at an acid pH of about 3.2, the preferred acid being sulphurous acid. The steep-water which results not only has little value or utility but presents a problem in respect to disposal since it is foul smelling and cannot readily be dumped into rivers or streams.

The steep-water which is prepared in this manner appears to contain a large amount of decomposed or putrefying proteins, the protein content being in excess of about 40%, and it also appears to be low in or devoid of water soluble carbohydrates or sugars.

It has now been found that it is possible to steep whole corn prior to the extraction and separation of the starch gluten, etc., therefrom in such a manner as to produce products of substantial value and utility which may be utilized as or in connection with food products as, for example, antioxidants and which also may be employed as a source of various carbohydrate and organic nitrogen and phosphorous containing complexes.

It has been found that when whole corn is immersed or extracted with water having a temperature above about 120° F. and preferably below about 150° F. with a pH above 4 and below 7 for a period of time exceeding 2 to 3 hours, but not more than about 15 to 20 hours, and followed by methanol or iso-propanol extraction and purification that most valuable extracts are obtained which may be utilized either in concentrated form or in paste or dried form and either as sources of water soluble carbohydrates and organic nitrogen and phosphorous complexes or directly as antioxidants for addition to or combination with glyceride oils, food compositions and other organic materials, preferably aqueous, subject to oxidative deterioration.

According to the preferred procedure, the whole corn is soaked or immersed in acidified water having a pH of 4.0 to 5.5 at a temperature of 120° F. to 135° F. and preferably at about 130° F. to 135° F. for about 5 to 15 hours and preferably for 10 to 12 hours.

From 1 to 10 parts of water are used to each 2 parts of corn. Preferably about 2 parts of corn and 1 part of water by weight are first mixed and as the extraction proceeds with the corn absorbing a portion of the water, additional water is added so that after, for example, 3 hours of extracting, an additional 30% of water may be added and there is generally obtained at the close of the extracting operation between 60% and 85% of the total amount of water originally added.

Where the corn itself has a tendency toward slight acidity, it may not be necessary to adjust the pH of the water before adding the corn thereto. It has, for example, been found in some cases that where the corn is added to the water at pH 7 to 7.5, after 2 or 3 hours of extraction the pH drops to between 4 and 5 so that no further acid adjustment is required.

The corn-water combination is preferably agitated, at least intermittently, during this first extraction procedure and the pH during extraction should be watched to be certain that the pH does not fall below 5.5.

Where desired, the water may be collected at the end of stated intervals of 30 minutes to 1 hour and added back on top of the corn in place of an agitation procedure.

At the close of the 10 to 15 hour period, the water will have removed certain desirable constituents from the corn, particularly carbohydrates, and this water is separated away from the whole corn by drawing off the bottom of a V shaped tank or by centrifuging with a basket type centrifuge.

The pH of the extracting water is preferably adjusted by the addition of sulfuric acid, and less preferably by hydrochloric, acetic, tartaric, or citric acid. Sulfurous or highly oxidizing acids are preferably not used. During the 10 to 15 hour extracting period, additional acid may be added to retain the pH at the desired point.

The water soluble extract thus obtained is then evaporated under reduced pressure such as from 15 inches to 29 inches and at a temperature preferably not exceeding 150 F. to 160° F. to between about 35% and 80% total solids. Where desired, prior to or during concentration, the pH may be adjusted to between 6 and 6.5, the composition filtered and followed by concentrating to the desired total solids content.

The concentrated water soluble extract is then added to a low molecular weight aliphatic alcohol, preferably iso-propyl alcohol, so that the finished combination contains from 4 to 9 parts of alcohol and water to each part of the solids in the extract, said alcohol and water being present in proportions varying from 1 to 7 parts of the alcohol to each 2 parts of water.

Preferably about 5 to 7 parts of a 60% iso-propanol and 40% water combination are present to each part of the solids in the extract. For example, if the concentrated water extract has been evaporated down to 50% total solids and if the extract in concentrated form amounts to 100 pounds, there will be prepared a mixture of 210 pounds of iso-propanol and 90 pounds of water and the 100 pounds of the concentrated water extract (containing 50 pounds solids and 50 pounds water) will be added to this alcohol-water mixture, the final ratio of water and alcohol being 40% water and 60% alcohol with the water and alcohol being present in an amount of 7 times that of the solids in the water extract.

In addition to iso-propanol, other low molecular weight aliphatic alcohols such as methyl, ethyl, butyl and propyl alcohol may be employed.

The extract-alcohol-water combination is then mixed sufficiently well so that each particle of the extract is brought into intimate contact with the alcohol, preferably at room temperature and for at least 5 to 10 minutes.

Precipitation occurs immediately and the mixture is stirred until all precipitable matter is formed.

The precipitate is then removed by centrifuging, filtration or similar means and the alcohol-water soluble fraction is then evaporated, preferably under reduced pressure, until the total solids are over 50% and preferably until the total solids are higher than the total solids of the original concentrated water extract, such as from 70% to 80% total solids.

A yield of from 25% to 40% of the alcohol-water soluble fraction is obtained against the solids in the first water soluble extract.

The final alcohol purified concentrated extract with or without absorption or concentration with carriers such as sugar, starch, salt, cereal flours, seed flours and powdered milk, may be added in small quantities, from say 0.03% to 5%, to food compositions and particularly aqueous glyceride oil containing compositions and in general to organic materials to retard oxidative deterioration thereof.

Either white or yellow whole corn may be utilized for the extracting procedure.

The temperature of the water at the time of the extraction should not be in excess of about 135° F. to 145° F. in order to avoid solubilization and gelatinization of the starch, protein decomposition and other forms of conversion, which are highly undesirable in the production of the desired extract.

The water temperature should also not be less than about 120° F. to 130° F. in order to obtain the maximum yield of the antioxygenic substances containing the water soluble carbohydrates. A difference of as little as 15° F. in the temperature of the water used for extraction may account for a 25% to 50% less in the yield of the extract that is obtained and therefore the most suitable temperature of the water for extraction is 130° F. to 135° F.

The partially or fully condensed alcohol purified extract thus obtained may be further purified by adding it to another lot of an alcohol-water mixture, preferably to 7 parts of a 60-40 mixture of iso-propanol and water to each part of the extract solids, followed by removal of the insoluble residues again formed and evaporation and concentration to 70% to 80% total solids.

This extract may, where desired, then be adjusted to a pH of about 5.0 to 5.5 and preferably to a pH of between 5.2 and 5.3 although this pH adjustment is not entirely necessary. Where the pH is adjusted, however, the extract may be filtered through cheese cloth or other filtering material and this filtrate may again be treated with an additional quantity of the iso-propanol water mixture followed by agitation, filtration and evaporation in order to obtain a more brilliant and more clear filtrate and extract.

The extract thus obtained is a rather dark colored but brilliantly clear extract which is completely water soluble and which does not leave any undesirable coagulated residues when added particularly to aqueous oxidizable food compositions.

At the same time this extract has enhanced antioxygenic activity and may be readily used for addition to oxidizable aqueous food compositions subject to oxidative deterioration.

Where drying of the extract is desired, the extract may be dried on trays preferably under a vacuum and in some instances spray or drum drying may be resorted to, but these latter methods are undesirable.

It has also been found satisfactory in connection with the drying of this extract to dry it in combination with cereals and cereal flours, seed flours, starch, sugar, salt and skim milk, which products may serve as carriers for the extract enabling these products to be more readily utilized for subsequent addition to other oxidizable compositions and they also appear to enhance the action of the extract itself as well as protecting the product thus treated against oxidative deterioration.

Where the extract is dried on sugar, it may be combined with the dry sugar crystals or with concentrated sugar syrup such as with molasses or mother liquors or with refined sugar syrups followed, where desired, by crystallization or centrifugal separation of the sugar crystals containing the extract applied thereto.

The extract may constitute as much as 40% to 70% against the total weight of the product against which it serves as a carrier or very small proportions may be applied such as no more than about 0.05% to 1% of the extract against the weight of the cereal, sugar, salt, etc.

With salt, the extract may be applied to the salt either in partly concentrated syrupy or pasty condition at a temperature of about 200° F. to 250° F. following which the balance of the water may be volatilized either at atmospheric pressure or under a vacuum.

The extract may similarly be combined with unconcentrated or concentrated whey or skim milk which, if desired, may be in caramelized condition and then the entire combination may be used in a concentrated or dried or pasty condition or evaporated to dryness and powdered.

Similar procedures may be used when the extract is combined with cereal flours, cereal flakes, starch or other types of cereal or seed material.

The extract may desirably be utilized in amounts varying from 0.01% to as high as 5% particularly for addition to aqueous oxidizable food composition such as to milk, cream, ice cream, orange juice, lemon juice, grapefruit juice, beverages, essential oil aqueous emulsions and glyceride oil emulsions such as mayonnaise, salad dressings, etc.

The extract may also be utilized for combination with brines in the treatment particularly of fatty fish such as herring, mackerel, salmon, sardines, etc. in the curing of meats such as bacon, hams, etc., or in the manufacture of sausage or other fatty meats subject to oxidative deterioration.

The extract may particularly be utilized for combination with breakfast cereals such as whole wheat flakes, corn flakes, oat flakes, or other breakfast cereals in which case they may be combined with the soup or mash prior to drying or applied as a spray on the finished rolled flakes before or after the drying operation or in any other manner in order to retard oxidative deterioration of the treated cereals.

Under these circumstances, it has been found particularly desirable for the pH of the finished extract to be not less than about 5.0 and preferably between about 4.0 and 4.5 and it has not been found desirable to adjust the pH of the finished alcohol purified extract to 5.2 or more where the extract is combined with a breakfast cereal or similar products.

Although this extract may be employed for direct addition to substantially pure glyceride or essential oils, the most desirable use for the present products is for addition to glyceride or essential oil containing oxidizable food compositions which may be either in aqueous condition or in substantially dry condition as it has been particularly found that the extract shows antioxygenic activity when applied to the aqueous or dried oxidizable food products.

In some instances where it is desired to reduce the carbohydrate content of the extract, dialysis procedures may be employed or even enzyme action may be utilized to solubilize the carbohydrates or to convert them into carbon dioxide or volatile materials which may be removed by subsequent evaporation or distillation procedures leaving behind a more concentrated product for use in accordance with the present invention.

Less preferably, there may be utilized the dilute sulfurous acid extract of whole corn made by extracting whole corn at pH 3 to 4 and at 110° F. to 120° F. followed by evaporation and concentration to over 50% total solids, which extract is purified by combining with a low molecular weight aliphatic alcohol such as iso-propanol in the proportions of alcohol and water indicated above followed by filtration of the precipitated material and concentration of the filtrate to 70% to 80% total solids.

The present application is a continuation in part of application, Serial No. 298,426, filed October 7, 1939, which matured into Patent 2,232,555; application Serial No. 420,132, filed November 22, 1941, which matured into Patent 2,282,808, which latter patent was divided out of application Serial No. 231,344, filed September 23, 1938, and which matured into Patent 2,273,062, and through said latter applications continues the subject matter of application, Serial No. 229,664, filed September 13, 1938, which matured into Patent 2,176,026, application Serial No. 249,990, filed January 9, 1939, which matured into Patent 2,176,027, and application Serial No. 15,307, filed April 8, 1935, which matured into Patent 2,176,029.

Having described my invention, what I claim is:

1. A method of making a corn extract useful for addition to food products which comprises extracting whole corn with water and then purifying the extract with an organic solvent selected from the group of the lower molecular weight aliphatic hydroxy compounds.

2. A method of making a corn extract useful for addition to food products which comprises extracting corn with water and then purifying the extract with a low molecular weight aliphatic alcohol.

3. A method of making a corn extract useful for addition to food products which comprises extracting corn with water and then purifying the extract with iso-propanol.

4. A method of making a corn extract useful for addition to food products which comprises treating corn with acidulated water, removing the corn residue, concentrating the clear soluble fraction, treating the concentrated soluble fraction with a low molecular weight aliphatic alcohol, removing the insoluble material, and then concentrating the alcohol soluble fraction to obtain an extract which is suitable for addition to foods.

5. A method of making a corn extract useful for addition to food products which comprises treating corn with water, removing the corn residues, concentrating the clear soluble fraction, treating the concentrated soluble fraction with an iso-propanol solution, removing the insoluble material, and then concentrating the iso-propanol soluble fraction to obtain an extract which is suitable for addition to foods.

6. A method of making a corn extract useful for addition to food products which comprises treating whole corn with from 1 to 10 parts of water to each 2 parts of whole corn, at a pH of between 4 and 7, agitating at a temperature of between 120° F. and 150° F., removing the corn residues, concentrating the clear soluble fraction to between 35% and 80% total solids, treating the said concentrated fraction with between 4 parts and 9 parts of an alcohol water mixture to each part of the total solids of the concentrated water extract, removing the insoluble material, and then concentrating the alcohol-water soluble fraction to between 70% and 80% total solids to obtain an extract which is suitable for addition to foods.

7. A method of making a corn extract useful for addition to food products which comprises treating 2 parts of corn with 1 part of water at a pH of between 4 and 5.5, agitating at a temperature of between 120° F. and 135° F., removing the corn residues, concentrating the clear soluble fraction to about 50% total solids, treating the said concentrated fraction with about 7 parts of a 60% alcohol and 40% water mixture to each part of the total solids of the concentrated water extract, removing the insoluble material, and then concentrating the alcohol soluble fraction to between 70% and 80% total solids to obtain an extract which is suitable for addition to foods.

8. A concentrated extract of corn suitable for addition to food products subject to oxidative deterioration, said extract being free of water insoluble ingredients and also being free of low molecular weight aliphatic alcohol insoluble ingredients, said extract comprising between 70% and 80% total corn solids and between 30% and 20% respectively of water.

9. A brilliantly clear concentrated extract of corn suitable for addition to food products subject to oxidative deterioration, said extract being free of water insoluble ingredients and also being free of iso-propanol insoluble ingredients, said extract comprising between 70% and 80% total corn solids and between 30% and 20% respectively of water.

10. A brilliantly clear concentrated sulfurous acid extract of corn suitable for addition to food products subject to oxidative deterioration, said extract being free of water insoluble ingredients and also being free of low molecular weight aliphatic alcohol insoluble ingredients, said extract comprising between 70% to 80% total corn solids and between 30% and 20% respectively of water.

11. A method of making a corn extract useful for addition to food products which comprises extracting whole corn with acidulated water at a pH between 4 and 5.5 and then purifying the extract with an organic solvent selected from the group of the lower molecular weight aliphatic hydroxy compounds.

12. A concentrated extract of corn suitable for addition to food products subject to oxidative deterioration, said extract being free of acidulated water insoluble ingredients and also being free of low molecular weight aliphatic alcohol insoluble ingredients, said extract comprising between 70% and 80% total corn solids and between 30% and 20% respectively of water.

SIDNEY MUSHER.